US009785299B2

(12) United States Patent
Wickboldt et al.

(10) Patent No.: US 9,785,299 B2
(45) Date of Patent: Oct. 10, 2017

(54) STRUCTURES AND MANUFACTURING METHODS FOR GLASS COVERED ELECTRONIC DEVICES

(71) Applicant: Synaptics Incorporated, San Jose, CA (US)

(72) Inventors: Paul Wickboldt, Walnut Creek, CA (US); Eric Jones, Santa Cruz, CA (US)

(73) Assignee: Synaptics Incorporated, San Jose, CA (US)

(*) Notice: Subject to any disclaimer, the term of this patent is extended or adjusted under 35 U.S.C. 154(b) by 647 days.

(21) Appl. No.: 13/727,081

(22) Filed: Dec. 26, 2012

(65) Prior Publication Data

US 2013/0169590 A1 Jul. 4, 2013

Related U.S. Application Data

(60) Provisional application No. 61/582,660, filed on Jan. 3, 2012.

(51) Int. Cl.
G06F 3/045 (2006.01)
G02B 1/18 (2015.01)
G02B 1/14 (2015.01)
G02B 1/10 (2015.01)
(Continued)

(52) U.S. Cl.
CPC ............ G06F 3/045 (2013.01); G02B 1/105 (2013.01); G02B 1/14 (2015.01); G02B 1/18 (2015.01); B32B 33/00 (2013.01); B32B 2457/202 (2013.01); G02F 2001/133311 (2013.01);
(Continued)

(58) Field of Classification Search
None
See application file for complete search history.

(56) References Cited

U.S. PATENT DOCUMENTS

| 4,151,512 | A | 4/1979 | Riganati et al. |
| 4,225,850 | A | 9/1980 | Chang et al. |
| 4,310,827 | A | 1/1982 | Asi |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.
(Continued)

Primary Examiner — Anthony J Frost
(74) Attorney, Agent, or Firm — Leydig, Voit & Mayer, Ltd.

(57) ABSTRACT

The disclosure is directed to electronic device displays which are constructed to withstand damage from an impact resistance test wherein a steel ball of 2 g having a diameter of 8 mm is dropped from a designated height greater than 1 ft, more preferably greater than 2 ft, even more preferably greater than 3 ft, still even more preferably greater than 4 ft, yet even more preferably greater than 5 ft and even more preferably greater than 6 ft. The displays are configured using, for example, ultrathin glass adhered to a base glass, wherein the adhesive layer is optimized for thinness and stiffness.

17 Claims, 6 Drawing Sheets

(51) Int. Cl.
   *B32B 33/00*     (2006.01)
   *G02F 1/1333*    (2006.01)
(52) U.S. Cl.
   CPC .......... *G02F 2001/133331* (2013.01); *G02F 2201/503* (2013.01); *G02F 2202/28* (2013.01)

(56) References Cited

U.S. PATENT DOCUMENTS

| | | |
|---|---|---|
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hsu et al. |
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,332,193 B1 | 12/2001 | Glass et al. |
| 6,333,989 B1 | 12/2001 | Borza |
| 6,337,919 B1 | 1/2002 | Dunton |
| 6,346,739 B1 | 2/2002 | Lepert et al. |
| 6,347,040 B1 | 2/2002 | Fries et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,401,551 B1 | 6/2002 | Kawahara et al. |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,597,289 B2 | 7/2003 | Sabatini |
| 6,643,389 B1 | 11/2003 | Raynal et al. |
| 6,672,174 B2 | 1/2004 | Deconde et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschudi |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,643,950 B1 | 1/2010 | Getzin et al. |
| 7,646,897 B2 | 1/2010 | Fyke |

(56) References Cited

U.S. PATENT DOCUMENTS

| | | |
|---|---|---|
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 2001/0026636 A1 | 10/2001 | Mainguet |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley, III |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen |
| 2003/0169228 A1 | 9/2003 | Mathiassen et al. |
| 2003/0174256 A1 | 9/2003 | Kim et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0017862 A1 | 1/2006 | Song et al. |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0099411 A1* | 5/2006 | Xia et al. ............ 428/343 |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0180261 A1 | 8/2007 | Akkermans et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0244277 A1 | 10/2008 | Orsini et al. |

(56) References Cited

U.S. PATENT DOCUMENTS

| | | | |
|---|---|---|---|
| 2008/0267462 A1 | 10/2008 | Nelson et al. | |
| 2008/0279373 A1 | 11/2008 | Erhart et al. | |
| 2009/0130369 A1 | 5/2009 | Huang et al. | |
| 2009/0153297 A1 | 6/2009 | Gardner | |
| 2009/0154779 A1 | 6/2009 | Satyan et al. | |
| 2009/0155456 A1 | 6/2009 | Benkley et al. | |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0279742 A1 | 11/2009 | Abiko | |
| 2009/0319435 A1 | 12/2009 | Little et al. | |
| 2009/0322705 A1* | 12/2009 | Halsey, IV | G06F 3/044 345/174 |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0097080 A1 | 4/2010 | Kobayashi et al. | |
| 2010/0119124 A1 | 5/2010 | Satyan | |
| 2010/0123675 A1 | 5/2010 | Ippel | |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Thompson et al. | |
| 2010/0180136 A1 | 7/2010 | Thompson et al. | |
| 2010/0189314 A1 | 7/2010 | Benkley et al. | |
| 2010/0208953 A1 | 8/2010 | Gardner et al. | |
| 2010/0244166 A1 | 9/2010 | Shibuta et al. | |
| 2010/0253879 A1* | 10/2010 | Hirai et al. | 349/62 |
| 2010/0272329 A1 | 10/2010 | Benkley | |
| 2010/0284565 A1 | 11/2010 | Benkley et al. | |
| 2011/0002461 A1 | 1/2011 | Erhart et al. | |
| 2011/0018556 A1 | 1/2011 | Le et al. | |
| 2011/0032205 A1* | 2/2011 | David | 345/173 |
| 2011/0102346 A1* | 5/2011 | Orsley et al. | 345/173 |
| 2011/0102567 A1 | 5/2011 | Erhart | |
| 2011/0102569 A1 | 5/2011 | Erhart | |
| 2011/0165393 A1* | 7/2011 | Bayne et al. | 428/215 |
| 2011/0182486 A1 | 7/2011 | Valfridsson et al. | |
| 2011/0214924 A1 | 9/2011 | Perezselsky et al. | |
| 2011/0267298 A1 | 11/2011 | Erhart et al. | |
| 2011/0298711 A1 | 12/2011 | Dean et al. | |
| 2011/0304001 A1 | 12/2011 | Erhart et al. | |
| 2012/0242635 A1 | 9/2012 | Erhart et al. | |
| 2013/0004695 A1 | 1/2013 | Kim et al. | |
| 2013/0108124 A1 | 5/2013 | Wickboldt et al. | |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| GB | 2480919 | 12/2011 |
| GB | 2490593 | 11/2012 |
| GB | 2496055 A | 5/2013 |
| JP | 04158434 A2 | 6/1992 |
| JP | 2005/242856 | 9/2005 |
| JP | 2010/103240 A | 6/2010 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 02/093239 A1 | 11/2002 |
| WO | WO 02/099520 A1 | 12/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | 2007/089054 A1 | 8/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |
| WO | WO 2011/126262 A2 | 10/2011 |

OTHER PUBLICATIONS

Maltoni, "Handbook of Fingerprint Recognition", XP002355942 Springer, New York, USA, Jun. 2003 (Jun. 2003) pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006 (Mar. 1, 2006), pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008 (May 31, 2008), pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

bellagiodesigns.com (Internet Archive Wayback Machine, www.bellagiodesigns.com date: Oct. 29, 2005).

(56) References Cited

OTHER PUBLICATIONS

German Patent Office, Office Action in Application No. 10 2013 000 218.4, mailed Feb. 13, 2015.

* cited by examiner

STRUCTURES AND MANUFACTURING METHODS FOR GLASS COVERED ELECTRONIC DEVICES

CROSS-REFERENCE

This application claims the benefit of U.S. Provisional Application No. 61/582,660, entitled Structure and Manufacturing Methods for Glass Covered Electronic Device by Paul Wickboldt and Eric Jones, filed Jan. 3, 2012, which application is incorporated herein by reference.

BACKGROUND OF THE INVENTION

A variety of electronic displays are used with electronic devices. Displays can operate using either emissive (pixels generate light), transmissive (light transmitted through pixels) and reflective (ambient light reflected) approaches. Display types may include, for example, liquid crystal displays (LCDs) which use liquid crystal cells that change transmission, or reflection in an applied electric field, organic light emitting diode (OLED) devices which utilize a light emitting diode (LED) in which an emissive electroluminescent film of organic compounds emits light in response to an electric current, and different types of electrophoretic displays in which pigmented particles are moved in response to an electric field (e.g. Gyricon, E-ink, etc.).

The LCD panel typically consists of two sheets of glass separated by a sealed-in liquid crystal material. Both sheets have a thin transparent coating of conducting material, with the viewing side etched into segments with leads going to the edge of the display. Voltages applied between the front and back coatings disrupt the orderly arrangement of the molecules sufficiently to darken the liquid and form visible patterns.

Additionally, displays have been developed that can detect the presence and location of touch, e.g., by a finger, or passive object such as a stylus or digital pen, are commonly referred to as touch screens. Touch screens have become a component of many computer and electronic devices. Many LCD displays are manufactured to include touch screen functionality. Touch screens can be attached or incorporated into to computers, networks, mobile telephones, video games, personal digital assistants (PDA), tablets, or any digital device. A variety of technologies are currently used to produce a device with touch screen capabilities. Technologies that enable touch screen functionality include: resistive touch screen panels; surface acoustic wave technology; capacitive sensing panels (e.g., using surface capacitance technology or projective capacitive touch technology, which uses either mutual capacitive sensors or self-capacitive sensors); infrared; optical imaging; dispersive signal technology; and acoustic pulse recognition. Touch screen functionality can be combined with a display in a device in many configurations. The touch screen sensing circuits can be incorporated directly in or on the layers of the display (using, for example, "in-cell" or "on-cell" approaches), built on a separate substrate which is laminated onto the display (e.g., using an "out-cell" approach), or laminated on a cover lens which protects the display in the device, or the sensing circuits can be incorporated directly on the back-side of this cover lens ("Touch-on-Lens"). See, for example, US2011/01025678A1 to Erhart published May 5, 2011, US2011/0102569A1 to Erhart published May 5, 2011, US 2011/0267298A1 to Erhart published Nov. 3, 2011, and US2012/0242635A1 to Erhart published Sep. 27, 2012.

As will be appreciated by those skilled in the art, electronic devices can be configured to include a variety of components and features including: a display, a touch screen, a scratch-resistant cover (e.g., lens), storage, a system on a chip, a CPU core, a GPU core, memory, Wi-Fi connectivity (e.g., 902.11 b.g), Bluetooth connectivity (e.g., USB connector), camera, audio, battery (e.g., built-in, rechargeable lithium-ion polymer battery), power connector, computer readable media, instructions capable of being performed by computer readable media (e.g., software), etc.

One drawback of currently available electronic device interfaces is that the screen can be damaged fairly easily. This can be particularly problematic for devices that are designed for increased mobility and may be subjected to harsh conditions. Currently, devices having an interface are manufactured to withstand a drop of ~1 foot. As will be appreciated, portable devices such as smart phones, touch pads, and other devices having currently available interfaces may often be deployed in environments where the device will be subjected to physical trauma, such as having a user drop the device from a height greater than 1 foot or having a heavy object fall on the device What is needed, therefore, is a device interface that can withstand the force of an impact equivalent to an impact resistance drop test performed at a height greater than 1 foot, more preferably, greater than 4 feet and even more preferably greater than 6 feet.

SUMMARY OF THE INVENTION

An aspect of the disclosure is directed to electronic device displays, methods of making the displays, and methods of using devices with the displays. Displays are formed from a thin glass (e.g., 30 um to 200 um in thickness), an adhesive (having a thickness d and a hardness K or Ym), and a base glass having a thickness of from 0.1 mm to 0.5 mm or greater. Either, neither or both the thin glass and base glass can be chemically strengthened. The total thickness of the adhesive layer between the thin glass and the base glass is preferably about 8-mil (200 um) or less, more preferably about 4-mil (100 um) or less, and even more preferably 3-mil (75 um or less) in thickness. Additionally, the modulus of the adhesive layer between the thin glass and the base glass has a modulus, when averaged by their thickness, of 1 GPa or greater, more preferably 2 GPa or greater, and even more preferably 3 GPa or greater.

Another aspect of the disclosure is directed to electronic device displays with sensors and methods of making the displays. Electronic device displays include, for example, a thin glass layer, a clear adhesive layer, a sensor layer, a plastic film layer, a second clear adhesive layer, and a base glass layer. Either, neither or both the thin glass and base glass can be chemically strengthened. The total thickness of the one or more adhesive layers is preferably about 8-mil (200 um) or less, more preferably about 4-mil (100 um) or less, and even more preferably 3-mil (75 um or less) in thickness. Additionally, the average modulus of the one or more adhesive layers between the thin glass and the base glass has a modulus, when averaged by their thickness, of 1 GPa or greater, more preferably 2 GPa or greater, and even more preferably 3 GPa or greater.

Still another aspect of the disclosure is directed to electronic device displays with sensors and methods of making the displays. Electronic device displays include, for example, a thin glass layer, a clear adhesive layer, a sensor layer, a second thin glass layer, a second clear adhesive layer, and a base glass layer. The total thickness of the one or more adhesive layers is preferably about 8-mil (200 um)

or less, more preferably about 4-mil (100 um) or less, and even more preferably 3-mil (75 um or less) in thickness. Additionally, the average modulus of the one or more adhesive layers between the thin glass and the base glass has a modulus, when averaged by their thickness, of 1 GPa or greater, more preferably 2 GPa or greater, and even more preferably 3 GPa or greater.

Yet another aspect of the disclosure is directed to electronic device displays which are constructed to withstand damage from a force equivalent to an impact resistance test wherein a steel ball of 2 g having a diameter of 8 mm is dropped from a designated height greater than 1 foot, more preferably greater than 2 foot, even more preferably greater than 3 foot, still even more preferably greater than 4 foot, yet even more preferably greater than 5 foot and even more preferably greater than 6 foot.

Yet another aspect of the disclosure is directed to electronic device displays which are constructed to withstand damage from a force equivalent to an impact resistance test wherein a steel ball of 130 g (+/−5 g) having a diameter of 31.8 mm (+/−1 mm) is dropped from a designated height greater than 1 foot, more preferably greater than 2 foot, even more preferably greater than 3 foot, still even more preferably greater than 4 foot.

Still another aspect of the disclosure is directed to an electronic display device that uses a transparent flex which can incorporate a wide variety of electronics into the display thereby creating a smart piece of glass.

An aspect of the disclosure is directed to impact resistant display devices. The impact resistant display devices comprise: a first thin glass layer having a thickness less than 400 micrometers; a second base glass layer having a thickness of from 0.1 to 0.5 mm; an adhesive layer positionable between the first thin glass layer and the second base glass layer having a thickness of 200 micrometers or less wherein the adhesive layer is selected based on one or more of a GPa measurement and a Young's Modulus measurement for the adhesive; and a sensor layer positioned between the first thin glass layer and the second base glass layer dimensioned to cover at least a portion of the height and width of the first thin glass layer or the second glass layer wherein the sensor layer is adaptable to communicate with a printed circuit board, wherein the display device has a total thickness of less than 800 micrometers and is constructed to pass a ball drop test of 2 grams at greater than 4 feet. In some configurations, a second thin glass layer is provided, wherein the sensor layer is positioned between the first thin glass layer and the second thin glass layer. Additionally, a plastic layer and a second adhesive layer can be provided, wherein the plastic layer and the second adhesive layer are positioned between the first thin glass layer and the second glass layer such that the two adhesive layers are not adjacent. The thickness-averaged modulus of the first adhesive layer, the second adhesive layer and the plastic layer is, in at least some configurations, greater than 1 GPa. Additionally, one or more of a coating, a plastic film, an ink layer, an anti-fingerprint layer, and a scratch-resistant layer can be provided. In still other configurations, the interface is in communication with a one or more of a printed circuit board, storage, memory, a system on a chip, a CPU core, a GPU core, Wi-Fi connectivity, Bluetooth connectivity, camera, audio, battery, power connector, computer readable media, and instructions for operation on computer readable media. The adhesive layer can also be selected such that it comprises several layers of different materials, and the modulus averaged by thickness through the adhesive is greater than 1 GPa. Additionally, the adhesive layer can have a modulus of greater than 1 GPa. In some aspects, the adhesive is optically transparent. Additionally, the sensor layer can further comprise thin patterned conductive traces. Suitable sensors include one or more of each of a touch screen sensor and a biometric sensor, such as a one dimensional or two dimensional fingerprint sensor. In at least some configurations, the thickness of the adhesive layer is a function of the at least one of the modulus GPa value for the adhesive and the Young's Modulus value of the adhesive. An amount of deformation of the first thin glass layer relative to the glass layer can be a function of at least one of a thickness between the first thin glass layer and the second glass layer and at least one of the GPa value for the adhesive and the Young's Modulus value of the adhesive. A second sensor layer can also be provided that is positioned between the first thin glass layer and the second base glass layer dimensioned to cover at least a portion of the height and width of the first thin glass layer or the second glass layer wherein the second sensor layer is adaptable to communicate with a printed circuit board and to operate independently of the first sensor layer.

Still another aspect of the disclosure is directed to impact resistant display devices. The impact resistant display devices comprise: a first thin glass layer having a thickness less than 400 micrometers; a second base glass layer having a thickness of from 0.1 to 0.5 mm; an adhesive layer positionable between the first thin glass layer and the second base glass layer having a thickness of 200 micrometers or less wherein the adhesive layer is selected based on one or more of a GPa measurement and a Young's Modulus measurement for the adhesive; and a sensor layer positioned between the first thin glass layer and the second base glass layer dimensioned to cover at least a portion of the height and width of the first thin glass layer or the second glass layer wherein the sensor layer is adaptable to communicate with a printed circuit board, wherein the display device has a total thickness of less than 1100 micrometers and is constructed to pass a ball drop test of 2 grams at greater than 4 feet.

Another aspect of the disclosure is directed to a method for making an impact resistant display device. The method comprises the steps of: providing a first thin glass layer having a thickness less than 400 micrometers, an adhesive layer having a thickness of from 0.01 to 0.4 mm and a second base glass layer having a thickness of from 0.1 to 0.5 mm; providing a sensor layer dimensioned to cover at least a portion of the height and width of the first thin glass layer or the second base glass layer; forming the adhesive layer on a surface the thin glass layer; placing the second base glass layer on the adhesive layer, wherein the display device is less than 800 micrometers in thickness and is constructed to pass a ball drop test of 2 grams at greater than 4 feet. Additional steps include, for example, applying a sheet of plastic to the sensor layer. The thin sheet of plastic can also have a conductive traces patterned on one or both sides. Additionally, a second thin glass layer wherein the sensor layer is positioned between the first thin glass layer and the second thin glass layer. An additional step can include providing a second sensor layer dimensioned to cover at least a portion of a height and width of the first thin glass layer or the second base glass layer.

Another aspect of the disclosure is directed to a method for making an impact resistant display device. The method comprises the steps of: providing a first thin glass layer having a thickness less than 400 micrometers, an adhesive layer having a thickness of from 0.01 to 0.4 mm and a second base glass layer having a thickness of from 0.1 to 0.5 mm; providing a sensor layer dimensioned to cover at least a portion of the height and width of the first thin glass layer or the second base glass layer; forming the adhesive layer on a surface the thin glass layer; placing the second base glass layer on the adhesive layer, wherein the display device is less than 1100 micrometers in thickness and is constructed to pass a ball drop test of 2 grams at greater than 4 feet.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

I. Devices

For purposes of illustration a touch screen display currently employed by, for example, a smart phone is described. Such a touch screen typically comprises a 9 cm (3.5 in)×6 cm (2.4 in) liquid crystal display (LCD) with a scratch-resistant glass layer. Other size touch screens can be employed without departing from the scope of the disclosure.

The capacitive touch screen of the LCD is typically optimized for a bare finger, or multiple finger multi-touch, sensing. However, as will be appreciated by those skilled in the art, a variety displays as well as a variety of touch screen configurations and touch screen operated devices can be used without departing from the scope of the disclosure.

An LCD touch screen typically is an assembly that includes an LCD, a printed circuit board (PCB) on which input-output (I/O) connections and integrated circuits (ICs) performing various functions are mounted, a transparent touch screen circuit pattern on a transparent substrate, and a protective shield or coating applied on top of the touch screen circuitry.

The touch screen circuitry is connected along with the LCD display to the PCB. The touch screen circuitry is typically incorporated into the assembly using one of two methods. In a first method, the touch screen circuitry is incorporated directly into or onto the LCD, then a protective shield or coating (e.g. cover lens) is located above the LCD/Touch screen combination. In a second method, the touch screen circuitry is applied onto the protective coating or shield (e.g. cover lens) and then the resulting structure is mounted above the LCD, with the touch screen circuitry mounted between the protective coating or shield and the LCD. In all cased the PCB is located below the LCD, out of view.

Figure 1:
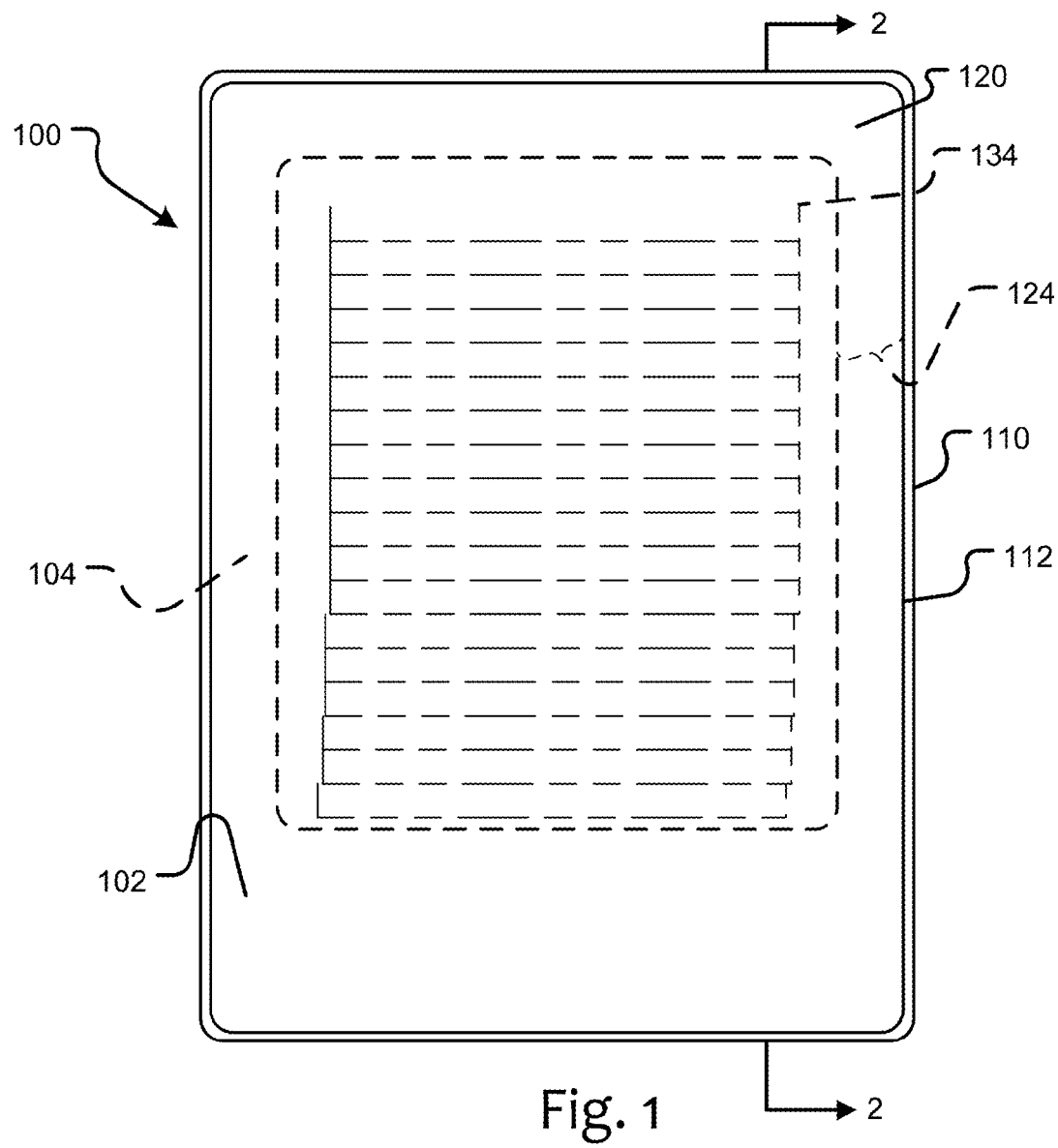
FIG. 1 is a top view of an exemplar electronic device having a display such as those currently available.

FIG. 1 is an electronic device 100 from a top or upper surface view. The device is any suitable electronic device, such as a smart phone, having a device or display interface 120 which a user engages with their finger. Depending upon the nature of the device and display used, the interface 120 can further be comprised of a plurality of parts, as discussed in further detail below.

The device itself has a top surface 102 and a bottom surface 104. Moreover, each component of the device 100 has an upper surface (i.e. a surface that faces the top surface of the device) and a lower surface (i.e. a surface that faces the bottom surface of the device) as will be appreciated from the cross-sectional views. The housing 110 of the electronic device 100 can be configured to form a bezel or rim 112 which secures the interface 120 within the housing 110 of the device 100. A mask 124, such as an ink mask, can be provided which frames at least part of the interface 120. The mask 124 is typically positioned such that it obscures device electronics located within the housing under a portion of the interface 120. For a touch screen enabled interface, a portion of the interface 120 that is not covered by mask 124 has a plurality of touch screen sensors 134. The plurality of touch screen sensors 134 can be any suitable conductor, including a transparent conductor, for example, from a layer of patterned indium tin oxide (ITO), carbon nanotubes, metal nanowires, conductive polymers or fine metal lines (e.g., copper lines). The dimensions of the device interface 120 can be from 3-25 cm width and from 5-30 cm in length.

Figure 2:
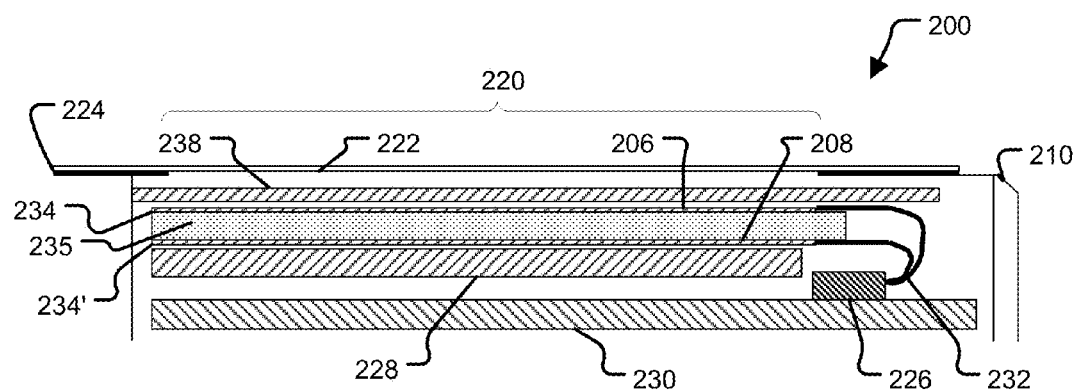
FIG. 2 is a side view of an exemplar electronic device having a display such as those currently available.

FIG. 2 is a cross-sectional view of an electronic device 200, such as device 100 of FIG. 1, taken along the lines 2-2 of FIG. 1. FIG. 2 illustrates a common cross-sectional view of a device, including the display. Electronic device 200 includes a housing 210, a printed circuit board (PCB) 230 and a display 228, such as an LCD or LCD module. The device can also include a touch sensor component 235, such as a glass layer, onto which a conductive layer such as indium tin oxide (ITO) or similar materials are applied to form the touch screen circuitry. The conductive layer can be applied such that it forms a pattern on the surface of the glass layer, as will be appreciated by those skilled in the art. As shown in FIG. 2, a first conductive layer 234 covers an upper surface 206 of the touch sensor component 235 and a second conductive layer 234' covers a lower surface 208 of the touch sensor component 235. The cover lens 238 can be formed from suitable material including, for example, a chemically hardened glass. A touch circuit controller 226 is coupled to a touch screen circuit or digitizer which can be formed from conductive layers 234, 234' of the touch circuit component 235 via a flexible circuit 232. The controller 226 is mountable on the PCB 230. A display 228 is positioned below the cover lens 238 and above the PCB 230. As will be appreciated by those skilled in the art, devices can also be configured such that part of the control functions are incorporated into a chip on the flex (COF) itself. The display 228 can include, for example, a glass layer as well as any other components required to achieve a functional display including logic devices. The protective layer 222 and display layer 228 can be formed from any suitable non-conductive material (e.g., glass, PET or a suitable hard coating).

Figure 3:
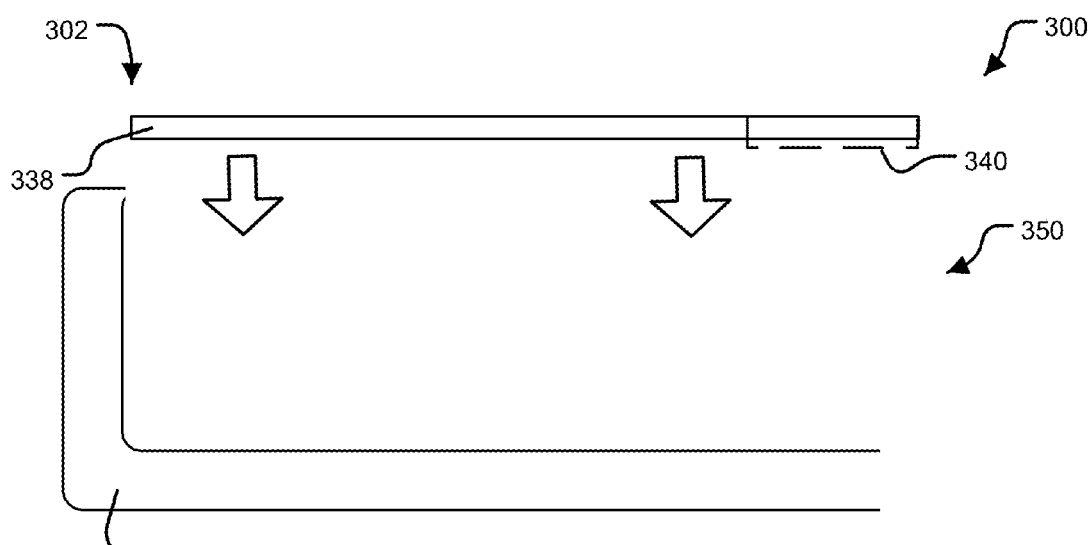
FIG. 3 is an illustration of a basic construction of an exemplar interface, such as a touch screen used with a smart phone, which uses a glass cover lens.

Turning now to FIG. 3, a basic construction of a touch screen suitable for use with a smart phone or other similar device is shown. The device 300 has a cover lens 338 with a sensor 340 positioned such that it is sensable by an upper surface 302 of the cover lens 338. The cover lens 338 is positioned such that it fits within a housing 310 that contains the remainder of the device components (including the display and electronics, as described above, for example, with respect to FIG. 2).

For various electronic and optical device products, including, but not limited to, capacitive fingerprint sensors, touch sensors and displays, it is desired to incorporate a layer (also referred to as a sheet) of thin glass as discussed below with respect to FIGS. 4-5. This glass may have a thickness of 400 micrometers or less, more specifically between 50 and 400 micrometers in thickness, and in some cases between 30 and 250 micrometers in thickness. Many of these products must be physically robust for their intended use. One test of this physical robustness or durability is to drop a steel ball onto the surface of the device to determine under what conditions (ball drop height, ball weight, substrate mounting, etc.) the product fails. Because of these requirements of durability, thin glass layers have been avoided in the structure of these devices.

In two specific implementations provided for illustration, a capacitive fingerprint sensor and/or a capacitive touch sensor may need to be incorporated into a device which has a display, such as on a touch screen phone. These phones often have a cover lens which is made from a chemically strengthened glass or base glass, typically 0.5 mm thick or thicker. However, as will be appreciated by those skilled in the art, cover lenses having a thickness between 0.3 mm and 0.5 mm, such as an ultrathin glass (UT) can also be used. This cover lens can also have other thin layers such as inks printed on them for visual effects or coatings used to reduce fingerprint smudging or enhance scratch resistance. In this embodiment, the sensors are located close to the finger, in this case within either 50 micrometers, 100 micrometers, or values between 30 micrometers and 300 micrometers. Thus, the sensors can be placed above the cover lens, or incorporated as part of a cover lens assembly. It is desired to place a glass layer above the sensor to retain the feel and many of the properties of the glass surface for the user.

II. Methods of Manufacture

As disclosed here, a method and structure has been developed which enables thin glass to be incorporated into these device products (and similar device products or components thereof) while achieving the durability that is required. Specifically, when this structure is subjected to steel ball impact tests, as discussed below, the results are similar to those obtained for existing commercial cover lenses made from strengthened glass. By providing the thin glass surface at or near the surface of the device product, the results of hardness and scratch resistance may also be similar to that for the existing commercial cover lenses made from strengthened glass.

FIG. 3 shows a basic assembly cross-section of a touch screen phone or similar device. As can be seen, the cover lens 338 is mounted above the display and other device components (shown in FIG. 2), onto the housing 310 (or bezel) of the device 300 has an interior cavity 350 sized to house the electronic components of the device. Typically sensors 340 are positioned at or near a top surface 302 of the cover lens 338.

Figure 4A:
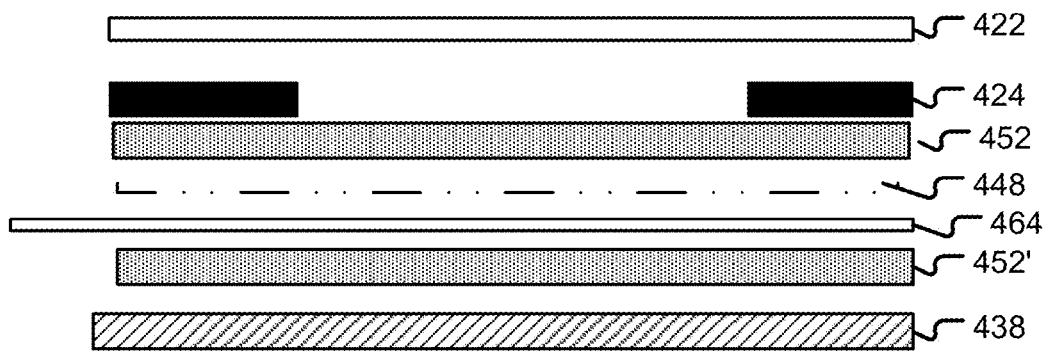
FIGS. 4A-B are illustrations of a construction of a cover lens assembly which incorporates a capacitive sensor near the surface where thin glass is also incorporated.
Figure 4B:
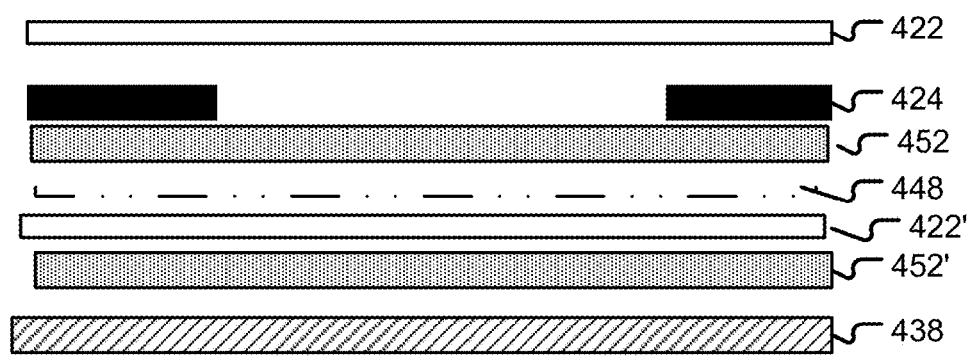

FIGS. 4A-B show a cover lens assembly in cross-section, which incorporates a base glass layer 438 that may be similar to that used in a typical commercial cover lens construction, but also now incorporates one or more sensors 448 and a thin glass layer 422 above the base glass layer 438. This base glass layer 438 may either be thin (between 30 um and 300 um thickness) or thicker (greater than 300 um up to 5 mm) and preferably strengthened. For all or any of the thin glass layers 422, 422', and base glass layer 438 in these structures, the glass may or may not be strengthened, although strengthened glass layers may have benefits. Suitable strengthened glass includes, for example, Corning® Gorilla® Glass, available from Corning Incorporated, Corning, N.Y.

In this example, sensors 448 can be made from thin patterned conductive traces on the surface (either top, bottom or both) of a thin sheet of plastic 464. With appropriate patterns and connections, these patterns can comprise, for example, a fingerprint sensor, a touch sensor, or a combination of both, and may or may not be transparent (e.g. could be copper or ITO or a combination of both). This sensor layer may cover the entire area of the cover lens, or only part of the area. There may also be ink patterns 424 printed on the surfaces of one of the glass layers or the plastic sheet, as for example a masking layer typically used in a cell phone. One or more adhesive layers 452, 452', can be used between and around the different layers to bond the assembly together.

In FIGS. 4A-B optically transparent adhesive(s), or optically clear adhesives (OCA), can be used between a sensor layer and a thin glass layer, and between a sensor and a base glass.

Additionally, a thin glass laminate (having a thickness of from 30-500 micrometers) 422, 422' can be positioned above and below the sensor 448.

Figure 5A:
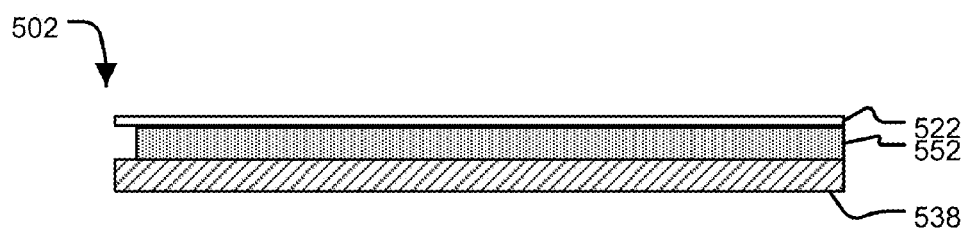
FIGS. 5A-B are illustrations of a cover lens assembly with thin glass as a top surface layer.
Figure 5B:
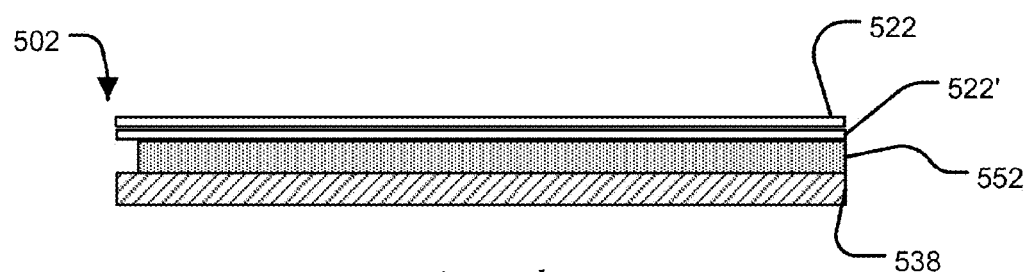

FIGS. 5A-B shows a cross-section of a general concept of a cover lens assembly which incorporates thin glass. The thin glass layer 522 is positioned as a top layer with respect to the adhesive and base glass layer 538. Note that this thin glass 522 could have additional layers on either the top or bottom side (e.g. ink patterns, anti-fingerprint coatings, etc.). Below the thin glass layer 522 is a base glass layer 538 which also may have additional coatings, if desired. This base glass layer 538 is preferably strengthened. This base glass layer 538 may have thicknesses in the range of 100 um to 300 um, or 300 um to 500 um, or be greater than 500 um. An adhesive layer 552 of thickness d and with a hardness given by the Bulk Modulus, K, is used to bond the thin glass layer 522 to the base glass layer 538. It may be desired to also have other layers, device components and devices positioned between the base glass layer 538 and the thin glass layer 522, wherein, for example, by doing so these additional components could be closer to an upper surface 502 than if they were located beneath the base glass.

Additionally, a thin glass laminate (having a thickness of from 30-500 micrometers) 522, 522' comprised of a first thin glass layer 522 and an second thin glass layer 522' can be positioned above and below the sensor 548.

One primary problem which this disclosure addresses is that the thin glass layer in assemblies, like the ones illustrated in FIGS. 3 and 4, are normally susceptible to breaking In particular, one way to test the durability of these assemblies is to subject them to ball drop tests to determine impact resistance, wherein a specified steel ball is dropped from successively increasing heights onto the surface of the assembly until breakage occurs. This susceptibility to breaking is solved by providing all the elements between the thin glass and base glass as being below a certain thickness, and having hardnesses above certain values. During a ball drop test, when the ball impacts the front surface, the thin glass layer may deflect locally toward conforming to the radius of the ball. In doing so, local stresses occur in this region which can result in the formation of a crack. The deformation of the thin glass layer can be reduced by increasing the hardnesses of the materials between the thin glass layer and the base glass layer. It also can be reduced by reducing the thickness of the space between the thin glass layer and the base glass layer. By choosing an appropriate combination of thicknesses and hardnesses, breakage of the thin glass layer due to impact, particularly due to ball drop testing, can be reduced or eliminated to the point where the overall breakage of the cover glass assembly is the same as a typical commercial assembly based on the strengthened glass. This is supported by the attached figures, data.

As will be appreciated by those skilled in the art, hardness can be defined many ways. The Bulk Elastic Modulus, K, is an example of a suitable measurement. However, this value is not always readily available, but for many of the materials of interest the Young's Modulus, $Y_M$, can be used as a substitute as it is often measured.

The configurations of this disclosure utilize a total thickness of the layers between the thin glass layer and base glass layer of about 8-mil (200 um) or less, more specifically 4-mil (100 um) or less, and even more specifically 3-mil (75 um or less) in thickness. Additionally, the modulus of these middle layers, averaged by their thicknesses, is 1 GPa or greater. When much of this thickness is defined by the adhesive thickness, the adhesive will be one of a high hardness.

TABLE 1

| Device Component | From | To |
|---|---|---|
| Interface Thickness (mm) | 0.013 | 0.075 |
| Adhesive Layer Thickness (mm) | 0.025 | 0.200 |
| Modulus of Middle Layers ($Y_m$, GPa) | 0.5 | 5 |

Types of adhesives that are included are polyester-based resins, acrylic-based resins and polycarbonate-based resins.

TABLE 2

| Material | $Y_m$ | PSI |
|---|---|---|
| Glass | ~50 GPa | ~7 × 10$^6$ |
| PET* | ~3.5 GPa | ~5 × 10$^5$ |
| EVA** | ~70 uPa | ~1,000-10,000 |

*Polyethylene Terephthalate (PET)
**Ethelyne Vinyl Acetate (EVA)

The device interfaces disclosed herein achieve an increased durability and performance of the electronic device interface by optimizing the thickness of the adhesive layer and the hardness.

The cover lens assemblies can be fabricated using a variety of processes, which depend critically on the type of adhesive being used. In general, the stack of layers are built-up sequentially by applying each layer on top of the other. This can happen in whichever order is appropriate for the desired handling of materials and schedule of applying process conditions such as heating, exposure to UV or applying pressure.

In one example, thermoforming and thermosetting adhesives are used, which are supplied as thin dry sheets. For these materials the full assembly is stacked up, which includes (by illustration of FIG. 5) the base glass layer 538, adhesive layer 552 and a thin glass layer 522. This stack of material is placed in a vacuum laminator and undergoes a series of process steps which include evacuation of surrounding air (to eliminate trapped air between layers), heating, application of pressure, and cooling. Timing and sequence of these steps can be optimized to improve the desired properties of, for example, optical clarity, smoothness, uniformity, hardness and adhesion. Example assemblies which include the adhesives of EVA and DuPont's PV5412 have been assembled utilizing such a process.

In another example, optically clear pressure sensitive adhesive (PSA) films, commonly referred to as optically clear adhesives (OCAs), are used. When using these adhesives, lamination is done by applying the film(s) with a roller laminator which applies pressure as the films are laminated. Heat may also be applied either during or after the physical lamination. The sequence of assembly may vary depending on many factors of material handling. In one example for these materials (by illustration of FIGS. 5A-B), the adhesive layer 552 is first applied to the base glass layer 538, then the thin glass layer 522 is applied to the stack of adhesive and base glass layer. In an alternative example for these materials, the adhesive layer 552 is first applied to the thin glass layer 522, thereafter the combination of the thin glass layer and adhesive layer are applied to the base glass layer 538. Following either of these lamination approaches, heat and/or pressure can be applied to accelerate bonding at the interfaces.

Other adhesives may include liquid epoxies. These may be applied as layers using a variety of coating methods including spray, gravure, slot, dispense, spin methods. Once the stack of layers to be bonded by the epoxy are formed, the epoxy may be hardened and cured using heat and/or exposure to UV radiation.

III. Methods of Use

An electronic device 100 configurable to position a sensor, such as a 1D sensor, a 2D sensor or a touch sensor, within sensing region is deployed by a user. The user applies and/or swipes his or her finger, or applies the element to be sensed, to a surface of the device in a position in communication with the sensor.

For example, the element to be sensed (such as a finger) can be applied (e.g., by swiping across the surface) in a position that is in communication with the sensing element. Thus, for example, the fingerprint is sensed by the fingerprint sensor and/or biometric input is received. The sensed input (such as a fingerprint) is validated. Once validated, use of the electronic device 100 is permitted or other functionality controlled by the fingerprint authentication is permitted.

As will be appreciated by those skilled in the art, the sensors disclosed can be used in a variety of ways including, for example:
  User authentication for device (e.g., phone, tablet, or computer) unlocking
  User authentication for online transactions
  User authentication for access to device systems and services, including websites and email
  Replacement of Password and PINs Physical access such as door locks Time and attendance systems (prove you were at a certain place at a certain time)

Finger-based input devices/navigation for mobile phones and gaming

Finger-based shortcuts (authentication of a given finger results in the corresponding action to which that finger is mapped)

Non-repudiation for online transactions

IV. Examples

Impact Resistance Test: STR® 15420P vs. DuPont® PV5412

Figure 6A:
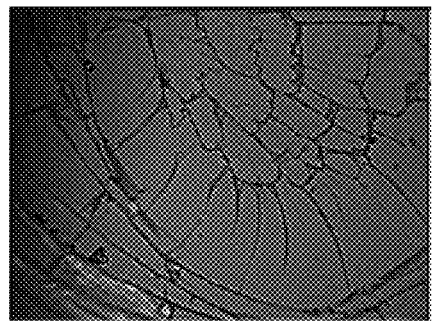
FIGS. 6A-B are images of the failure height of the STR® 15420P at 1 foot (FIG. 6A) and the DuPont PV5412 at 6.5 feet (FIG. 6A)
Figure 6B:
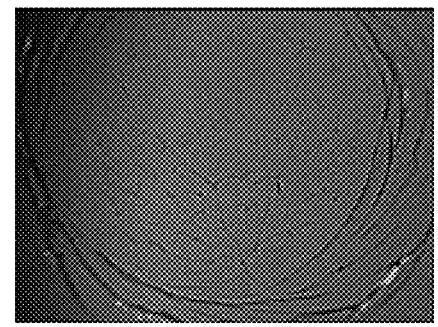
Figure 6C:
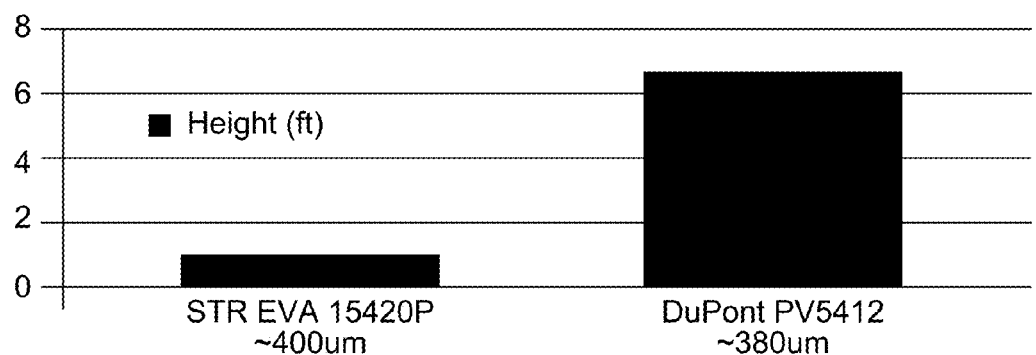
FIG. 6C is a chart showing the height at which the failure occurred during the impact resistance testing for the STR EVA 15420P~400 um, and the DuPont PV5412~380 um.

The object of this test was to measure the difference between STR Photocap® 15420P EVA thermal adhesive (~400 um), available from Specialized Technology Resources, Inc. (www.strsolar.com, Enfield, Conn.), and DuPont® PV5412 thermal adhesive (380 um), available from DuPont Photovoltaic Solutions (www2.dupont.com/photovoltaics/en_US/products_services!), via an Impact Resistance Test. To achieve this, a 2 g steel ball with a diameter of 8 mm was dropped from a designated height five times. The drop height was increased until failure occurred. The test package consisted of: glass, thermal adhesive, thin glass. A substantial difference was measured between the two thermal adhesives, the DuPont PV5412 adhesive increased impact strength over the STR EVA material. The impact resistance improvement is attributed to the greater hardness of the Dupont PV5412 material. FIG. 6A illustrates an image of the device interface after the impact resistance test failure for 15420P at 1 foot, and FIG. 6B illustrates an image of the device interface after the impact resistance test failure for the DuPont PV5412 at 6.5 feet. The breakage of the ultrathin (UT) glass for the standard configuration was due to too much deflection during impact which causes a tensile break. The PV 5412 material (FIG. 6B) reduced deflection by using an adhesive layer that is harder than that of the EVA material. The DuPont® PV5412 is expected to have a Young's Modulus above 1 GPa, while the STR Photocap® 15420P EVA is expected to have a Young's Modulus in a range below 0.1 GPa. FIG. 6C is a chart illustrating the relative impact resistance test results and the height at which failure occurred for the materials shown in FIGS. 6A-B.

Figure 7A:
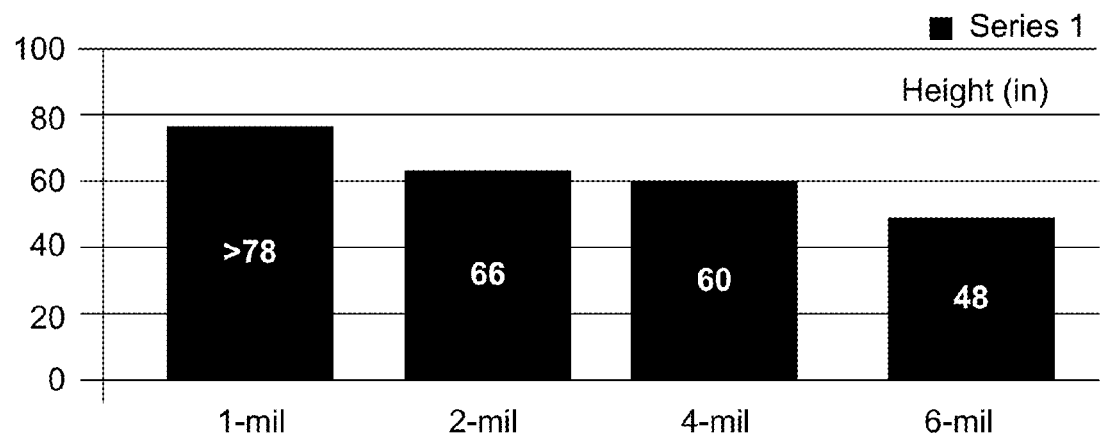
FIG. 7A illustrates impact test results using showing failure distance in inches vs. optically-clear adhesive (OCA) thickness.

FIG. 7A illustrates impact test results using an OCA (available from 3M Company, St. Paul, Minn., such as OCA 8173, 8211, 8212, 8213, 8214, or 8215) which comprises the following layers: glass-OCA-ultrathin glass (UT). Failure distance (in inches) are provided for configurations having an OCA thickness of 1 mil-6 mil. Failure distances were well above 1 foot, and typically 4 feet (48 inches) or above.

Figure 7B:
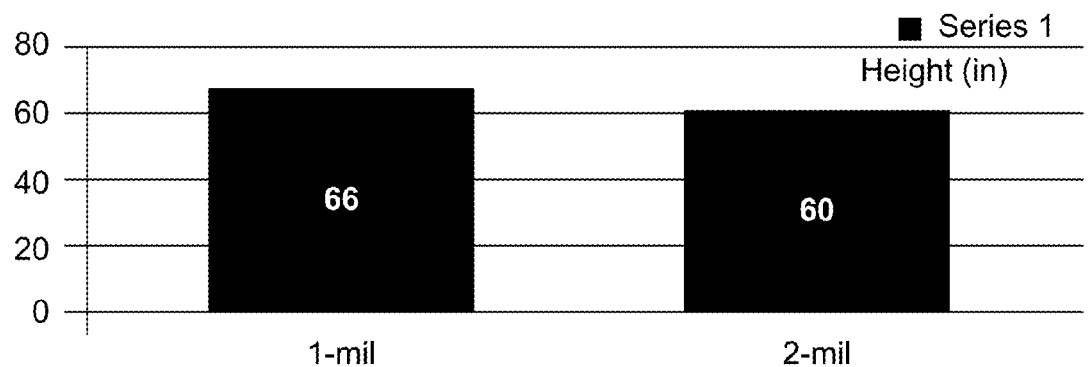
FIG. 7B illustrates impact test results showing failure distance vs. OCA thickness.

FIG. 7B illustrates impact test results using an OCA (available from 3M Company, such as OCA 8173, 8211, 8212, 8213, 8214, or 8215) which comprises a multi-layered structure having the following layers: glass-OCA-2 mil PET-OCA-UT. Failure distance (in inches) is provided for configurations having an OCA thickness of 1 mil-2 mil. Failure distance was 5 feet (60 inches) or above.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An impact resistant display device comprising:
    a first thin glass layer having a thickness less than 400 micrometers;
    a second base glass layer having a thickness of from 0.1 to 0.5 mm;
    an adhesive layer positionable between the first thin glass layer and the second base glass layer having a thickness of 200 micrometers or less, wherein the adhesive layer is selected based on one or more of a GPa measurement and a Young's Modulus measurement for the adhesive layer; and
    a sensor layer positioned between the first thin glass layer and the second base glass layer dimensioned to cover at least a portion of a height and width of the first thin glass layer or the second base glass layer wherein the sensor layer is adaptable to communicate with a printed circuit board,
    wherein the impact resistant display device has a total thickness of less than 800 micrometers and is constructed to pass a ball drop test of 2 grams at greater than 4 feet,
    wherein an element to be sensed is capable of being applied and/or swiped on the first thin glass layer, wherein the element to be sensed comprises a finger of a user, and
    wherein the adhesive layer comprises several layers of different materials, and a modulus averaged by thickness through the several layers is greater than 1 GPa.

2. The impact resistant display device of claim 1 further comprising a second thin glass layer wherein the sensor layer is positioned between the first thin glass layer and the second thin glass layer.

3. The impact resistant display device of claim 1 further comprising a plastic layer and a second adhesive layer, wherein the plastic layer and the second adhesive layer are positioned between the first thin glass layer and the second base glass layer such that the adhesive layer and the second adhesive layer are not adjacent.

4. The impact resistant display device of claim 3 wherein a thickness-averaged modulus of the adhesive layer, the second adhesive layer and the plastic layer is greater than 1 GPa.

5. The impact resistant display device of claim 1 further comprising one or more of a coating, a plastic film, an ink layer, an anti-fingerprint layer, and a scratch-resistant layer.

6. An impact resistant display device, comprising:
    a first thin glass layer having a thickness less than 400 micrometers;
    a second base glass layer having a thickness of from 0.1 to 0.5 mm;
    an adhesive layer positionable between the first thin glass layer and the second base glass layer having a thickness of 200 micrometers or less, wherein the adhesive layer is selected based on one or more of a GPa measurement and a Young's Modulus measurement for the adhesive layer; and
    a sensor layer positioned between the first thin glass layer and the second base glass layer dimensioned to cover at least a portion of a height and width of the first thin glass layer or the second base glass layer wherein the sensor layer is adaptable to communicate with a printed circuit board, wherein the impact resistant display device has a total thickness of less than 800 micrometers and is constructed to pass a ball drop test of 2 grams at greater than 4 feet,
wherein an element to be sensed is capable of being applied and/or swiped on the first thin glass layer, wherein the element to be sensed comprises a finger of a user, and
wherein the adhesive layer comprises several layers of different materials, and a modulus averaged by thickness through the several layers is greater than 1 GPa.

7. The impact resistant display device of claim 1 wherein the adhesive layer is optically transparent.

8. The impact resistant display device of claim 1 wherein the sensor layer further comprises thin patterned conductive traces.

9. The impact resistant display device of claim 1 wherein the sensor layer comprises one or more of a touch screen sensor and a biometric sensor.

10. The impact resistant display device of claim 1 wherein the thickness of the adhesive layer is a function of the at least one of the GPa measurement for the adhesive layer and the Young's Modulus measurement of the adhesive layer.

11. The impact resistant display device of claim 1 wherein an amount of deformation of the first thin glass layer relative to the second base glass layer is a function of at least one of a thickness between the first thin glass layer and the second base glass layer and at least one of the GPa measurement for the adhesive layer and the Young's Modulus measurement of the adhesive layer.

12. The impact resistant display device of claim 1 further comprising a second sensor layer positioned between the first thin glass layer and the second base glass layer dimensioned to cover at least a portion of the height and width of the first thin glass layer or the second base glass layer, wherein the second sensor layer is adaptable to communicate with a printed circuit board and to operate independently of the sensor layer.

13. The impact resistant display device of claim 1, wherein the impact resistant display device is configured to be mounted over a liquid crystal display (LCD).

14. The impact resistant display device of claim 1, wherein the adhesive layer bonds the first thin glass layer to the second base glass layer.

15. The impact resistant display device of claim 1, wherein the adhesive layer is bonded to a lower surface of the first thin glass layer, wherein the finger is capable of being applied and/or swiped on an upper surface of the first thin glass layer.

16. The impact resistant display device of claim 1, wherein the sensor layer comprises a capacitive fingerprint sensor.

17. The impact resistant display device of claim 1, wherein the adhesive layer bonds the first thin glass layer to the second base glass layer, wherein the adhesive layer is bonded to a lower surface of the first thin glass layer, wherein the sensor layer comprises a capacitive fingerprint sensor configured to capture a fingerprint applied and/or swiped on an upper surface of the first thin glass layer, and wherein the impact resistant display device is mounted over a liquid crystal display (LCD).

* * * * *